United States Patent
Zajicek et al.

(10) Patent No.: US 7,588,283 B2
(45) Date of Patent: Sep. 15, 2009

(54) TRUCK BED COVER

(75) Inventors: Jason Zajicek, Portage, WI (US); Scott Burmeister, Libertyville, IL (US)

(73) Assignee: Penda Acquisition, Inc., Portage, WI (US)

( * ) Notice: Subject to any disclaimer, the term of this patent is extended or adjusted under 35 U.S.C. 154(b) by 0 days.

(21) Appl. No.: 11/543,000

(22) Filed: Oct. 4, 2006
(Under 37 CFR 1.47)

(65) Prior Publication Data
US 2007/0108079 A1 May 17, 2007

Related U.S. Application Data

(60) Provisional application No. 60/724,475, filed on Oct. 6, 2005.

(51) Int. Cl.
*B62D 33/04* (2006.01)
(52) U.S. Cl. ............................... 296/100.02
(58) Field of Classification Search ............ 296/100.02; 52/793.1; 428/178
See application file for complete search history.

(56) References Cited

U.S. PATENT DOCUMENTS

| | | | | |
|---|---|---|---|---|
| 2,998,342 A | * | 8/1961 | Waugh et al. | 156/254 |
| 5,743,586 A | * | 4/1998 | Nett | 296/100.02 |
| 5,888,612 A | * | 3/1999 | Needham et al. | 428/116 |
| 6,340,194 B1 | * | 1/2002 | Muirhead et al. | 296/100.06 |
| 6,547,310 B2 | | 4/2003 | Myers | |
| 7,093,881 B2 | * | 8/2006 | Rusu | 296/100.07 |
| 2006/0263620 A1 | * | 11/2006 | Vanderstappen et al. | 428/515 |

OTHER PUBLICATIONS

FRP and Tricel Honeycomb., http://www.tricelcorp.com/frp/index.htm. Printed Jun. 20, 2005.
General Information, Design and Versatility.
FRP Technical Bulletin, http://www.tricelcorp.com/frp/frptech.htm. Printed Jun. 20, 2005.

* cited by examiner

*Primary Examiner*—Dennis H Pedder
(74) *Attorney, Agent, or Firm*—Lathrop & Clark LLP

(57) ABSTRACT

A rigid cover assembly for covering the rear cargo compartment of a pickup truck. There is a tip plastic sheet that may have an acrylic surface placed over it for improved visual appearance. A bottom plastic sheet conforms to the shape of the top plastic sheet and is joined around the perimeter to the top plastic sheet. There is a fiberglass layer that is placed on the inside surface of the top and bottom plastic sheets that provides a bonding means for attaching a honey comb structural layer to the fiberglass layers. This provides light weight structural strength to the cover. The honeycomb that is attached to the plastic sheets reduces wetness marks.

28 Claims, 5 Drawing Sheets

TRUCK BED COVER

CROSS REFERENCE TO RELATED APPLICATION

This application is based on and claims priority of provisional patent application 60/724,475 filed Oct. 6, 2005, the disclosure of which is incorporated herein by reference.

BACKGROUND

This invention relates to tonneau covers for the cargo compartment of pickup trucks.

Pickup trucks have rectangular shaped beds at the rear of the vehicle, generally with a pivoting tailgate that pivots downwardly and in a rearward direction to a flat, horizontal plane that is generally in the same plane as the floor of the bed. Pickup trucks are used for numerous purposes for hauling all types of articles, that vary in size, shape and weight. At times it is beneficial that the bed be covered to protect the articles being transported.

Various covers have been used in the past. There are essentially two types of tonneau covers: flexible and rigid. One type is comprised of flexible covers including canvas, other fabrics, and flexible vinyl covers. The flexible cover is secured to the pickup truck by ropes, flexible cords, and other straps that are secured by hooks, ties, snaps, and other fasteners or attached to frames that are mounted on the pickup truck. A disadvantage of these types of covers is that they are extremely time consuming to put in place and secure to the truck, with a similar amount of time required to remove them. Due to the flexible characteristics of the cover, they can allow water to pool in low spots, rather than run off and onto the ground. Due to their lack of structural strength, they do not permit the user to install other items, such as racks, onto the flexible cover and provide minimal security.

As an alternative to a flexible cover, a second type of tonneau cover has gained popularity. These are rigid covers comprised of one piece rigid covers and multi-piece sectional rigid covers. Fiberglass, metal, and rigid plastic covers have been introduced and are usually pivotally connected to a frame or brackets mounted to the front and sides of the pickup truck bed. These allow the user to raise the cover from the rear of the bed, place the items in the bed, and lower the cover to protect the items. Generally hinges or other connectors are used to connect the cover to the truck bed or truck body. These connections are not readily or easily removed if the cover is to be removed for additional storage space. A disadvantage of these types of covers is their weight and the durability of the aesthetics of their top surface. Another disadvantage is complexity of installing and aligning the frame or brackets to the pickup truck bed.

Many of the rigid covers are made of two joined pieces or shells of plastic, such as illustrated in U.S. Pat. No. 6,547,310 issued to Myers. This patent illustrates a plastic cover that has supporting or reinforcing ribs placed across the bottom side of the cover. This design has several disadvantages that are found in all covers using a supporting ribbed structure. One disadvantage is that when a user wants to add an option or attachment to the cover, the mounting is made more difficult due to the rib structure. In all other areas of the cover, the thickness of the sheet precludes making a strong and solid attachment. Depending on where the attachment is made, a bolt, screw, or other fastener may be passing through only a thin portion of the cover or could be passing through the top surface and the generally hollow rib structure. Thus, the user is restricted to where he or she can mount the accessory.

Another disadvantage of this type of plastic tonneau construction is that it requires some form of reinforcing rib on the underside of the cover for structural rigidity. An example of this is seen in U.S. Pat. No. 6,340,194 issued to Muirhead et al. This patent illustrates a cover made from two sheets of heat deformable plastic material instead of using fiberglass reinforced plastic. The bottom panel has reinforcing ribs for additional strength. This reinforcing structure creates lines ("witness marks") that are easily or at least partially visible to the observer on the top side of the cover. In extreme temperatures or when condensate forms due to humidity and temperature changes, the lines on the cover are even more obvious.

This type of plastic tonneau also has a non uniform, and generally not even under surface due to the reinforcing rib structure. If the underside is not even, it makes it difficult to satisfactorily attach carpet or other sheet materials to the under or bottom surface and also makes it difficult to mount accessories. These materials are preferably maintained flat against the underside of the cover for appearance reasons.

Yet another disadvantage of the two piece ribbed designs that have large areas between places where the two pieces are bonded together is that differential thermal expansion and contraction on the top cover piece often causes cracking, peeling, bowing, or other deformation of other surface imperfections, of paint applied to the top surface. This construction has large areas on the top shell that are not rigidly bonded to the bottom shell. The non-bonded areas of the top shell thermally expand and contract at a different rate than the areas of the top shell that are bonded to the bottom shell. This thermal expansion and contraction result in cracking and bowing which lead to cracking and peeling of the paint on the top surface of the top shell and other undesirable surface effects.

SUMMARY OF INVENTION

Applicant's invention is a two-piece cover that is constructed from a top sheet and a bottom sheet. The top sheet is made from a co-extruded sheet with an acrylic or thermoplastic polyolefin top layer over a plastic layer, such as polycarbonate and acrylonitrile butadiene styrene, or other suitable material with UV stabilizers. The bottom sheet is also made of a plastic, such as polycarbonate and acrylonitrile butadiene styrene, or other suitable material. There is a honeycomb structure between the top and bottom sheets. A layer of resin is applied to the inside of the top and bottom sheets. Then a layer of fiberglass is placed between the layers of resin and the top and bottom sheets are joined together with the honeycomb structure securely mounted between the sheets and the outer perimeter of the two sheets are bonded together with an adhesive.

OBJECTS AND ADVANTAGES

It is an object of the invention to provide a lightweight pickup truck cover that is made from a top and a bottom sheet with a honeycomb structure disposed between the two sheets. It is another object to provide a cover that securely bonds the honeycomb structure to the top and bottom shells so that the bond will not easily be broken. A related object is to provide a cover that has sound deadening properties due to the creation of dead air space between the two layers.

It is another object to provide a cover that has a first fiberglass layer disposed between the top cover and the honeycomb structure and a second fiberglass layer disposed between the bottom cover and the honeycomb structure.

It is still another object to provide a cover that has a smooth top surface over substantially the entire visible surface of the top sheet.

Still another object is to provide a pickup truck cover that has a high strength to thickness ratio as compared to prior art covers. A related object is to provide a cover that has sufficient thickness and strength throughout the cover so that bolts, screws, or other fasteners can pass through the cover to securely attach accessories to the cover at any location on the cover.

Yet another object is to provide a pickup truck cover that uniformly supports the top and bottom shells over numerous supporting points to minimize witness marks on the visible portion of the top shell and to facilitate painting or the use of molded in colors.

These and other objects and advantages will be apparent from the following description of the drawings and description of the preferred embodiment.

DETAILED DESCRIPTION

Figure 1:
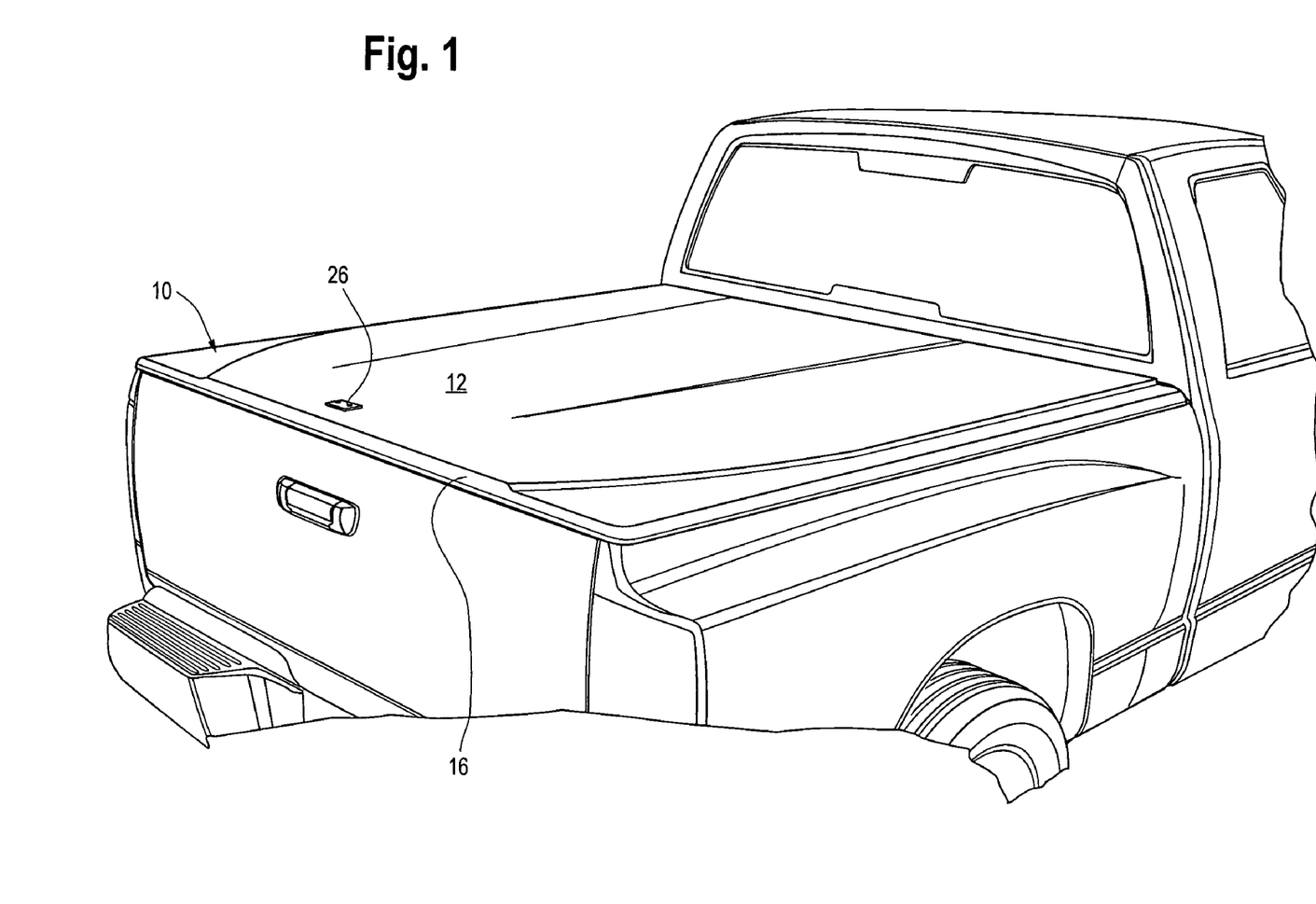
FIG. 1 is a rear perspective view of an exemplary embodiment of a tonneau cover installed on the cargo bed of a pickup truck according to the invention.
Figure 2:
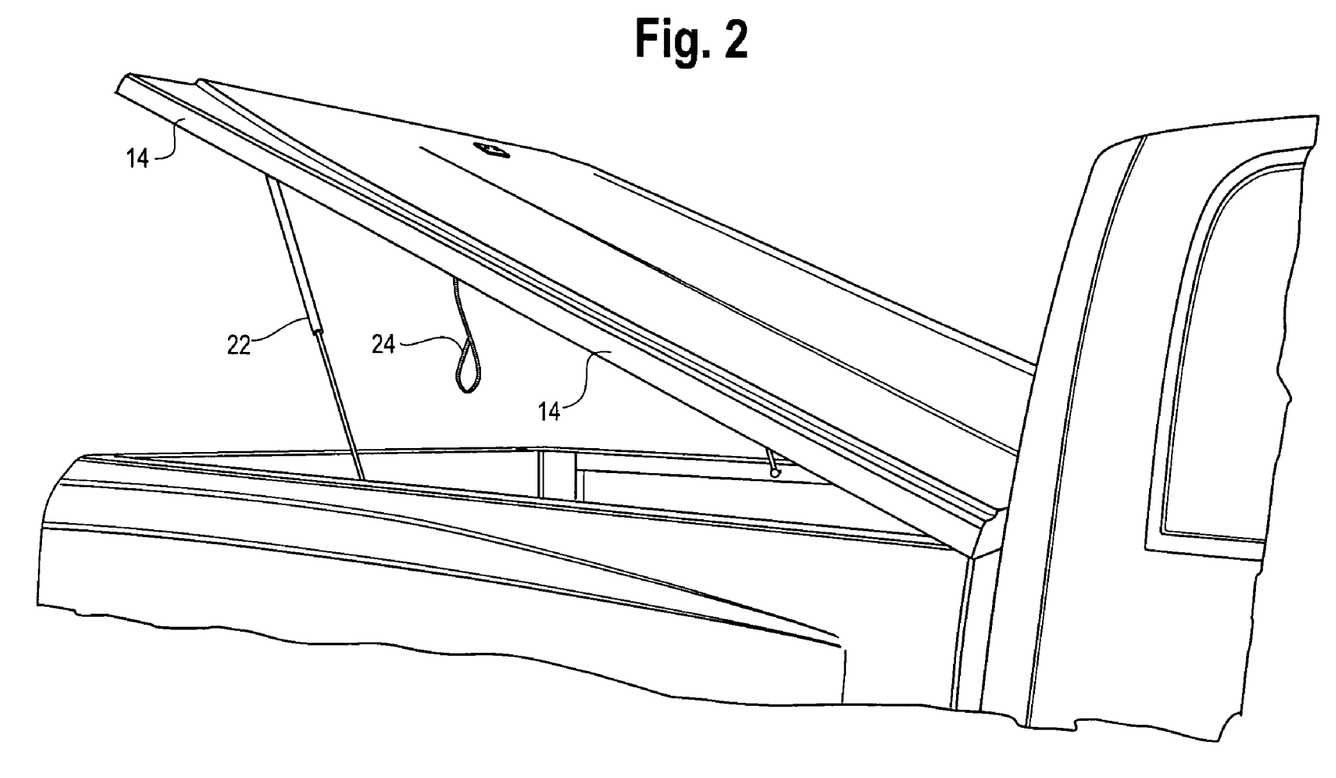
FIG. 2 is a perspective view of an exemplary embodiment of a tonneau cover in the opened position according to the invention.
Figure 3:
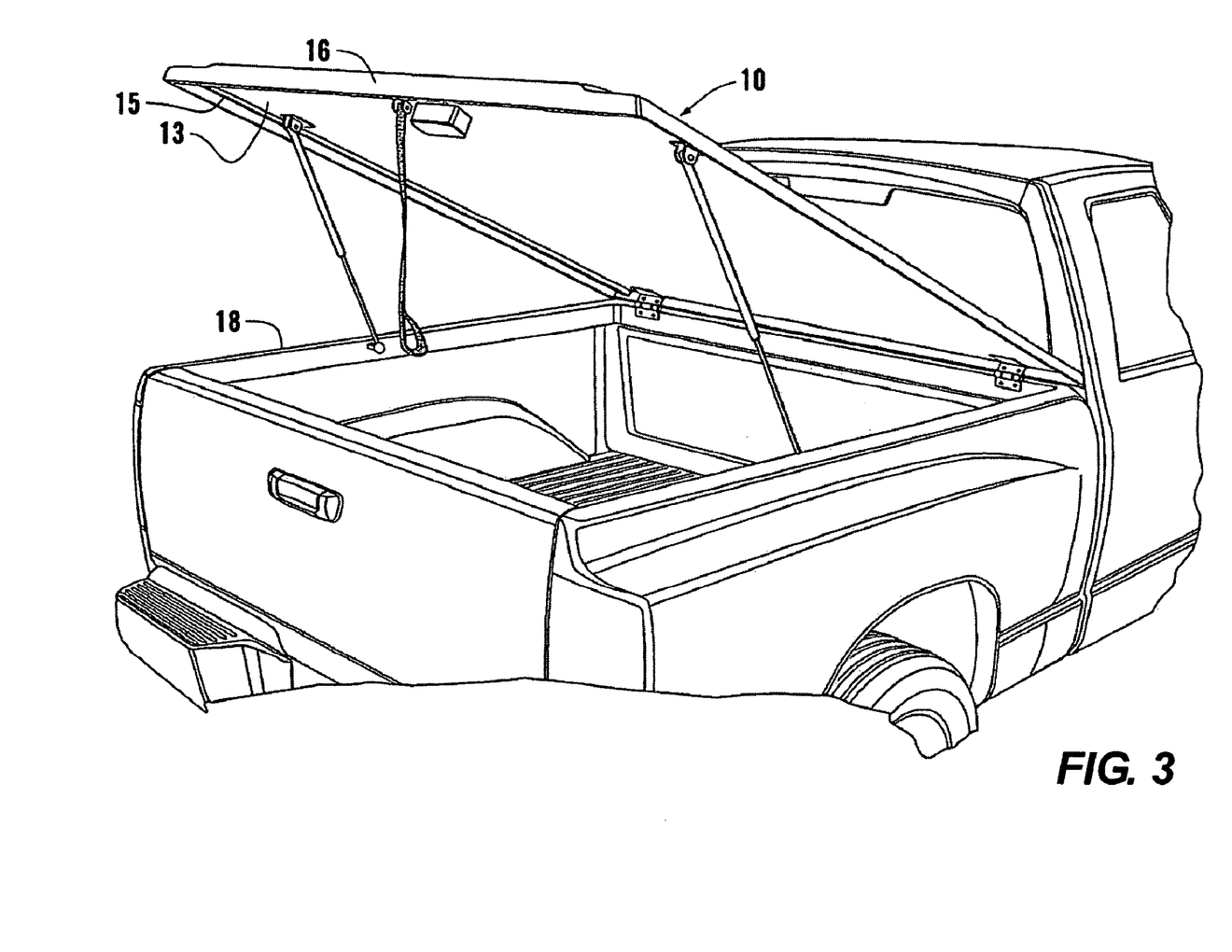
FIG. 3 is a rear perspective view of an exemplary embodiment of a tonneau cover with the cover in the opened position according to the invention.
Figure 4:
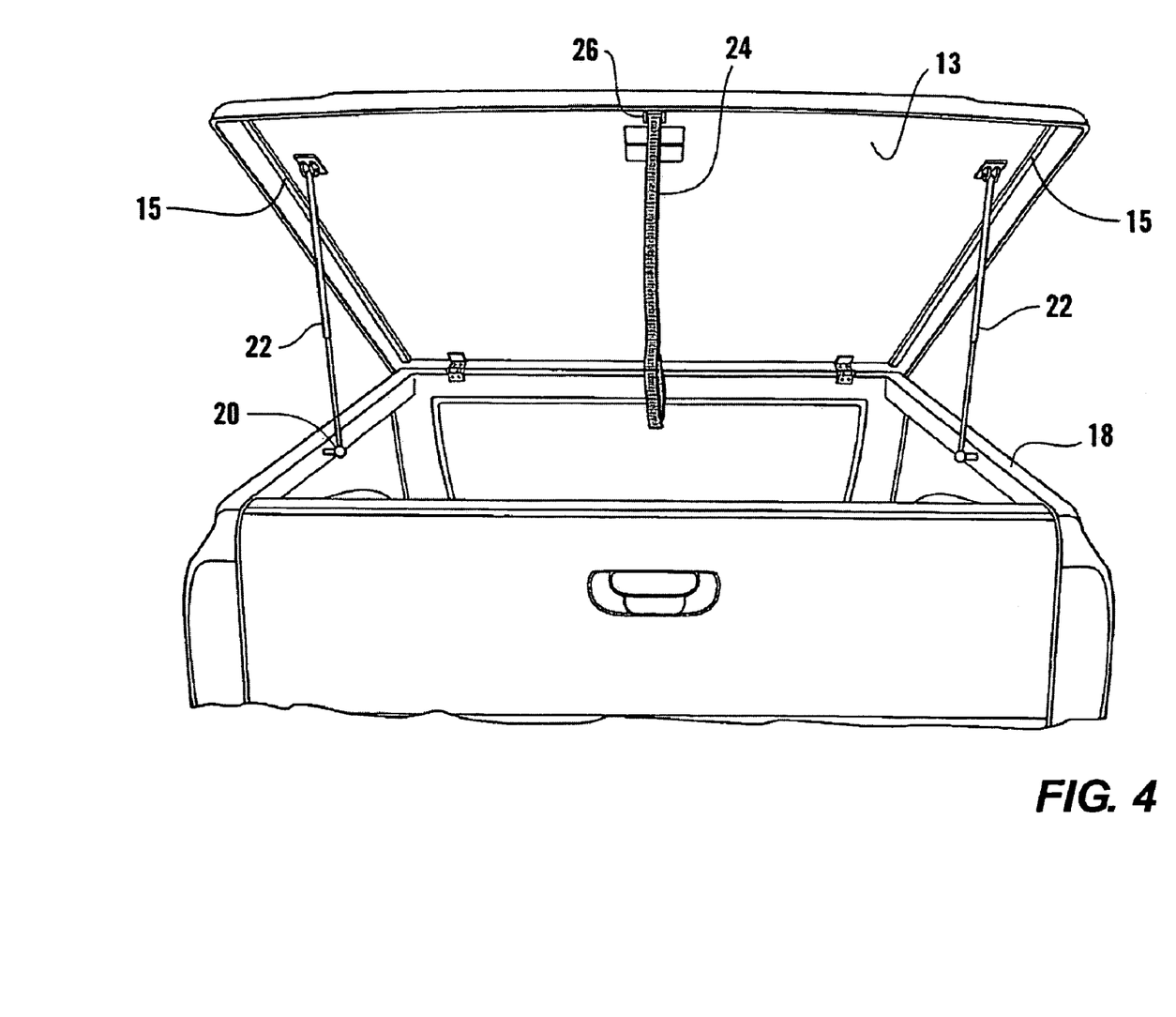
FIG. 4 is a rear view of an exemplary embodiment of a tonneau cover with the cover in the opened position according to the invention.

Turning first to FIG. 1, an exemplary embodiment of the inventive tonneau cover 10 is illustrated in its closed position covering the cargo bed of a pickup truck. The cover 10 has a smooth top surface 12 and an underside surface 13, with side overhanging edges 14, and a rear overhanging edge 16. Grain or texture can be formed into top surface 12 and top surface 12 can be formed with various surface geometries and patterns. For purposes of this patent "smooth outer surface" means a surface of a single sheet of plastic that has an attractive consistent finish (e.g., there are no visually significant witness lines or variations in color caused by the support structure) whether or not formed with various macro-geometries, shapes, and/or patterns (see, e.g., FIG. 1). The overhanging edges 14, 16 extend over upstanding walls 18 of the truck bed 20 so that water runs off the top 12 and does not enter into the cargo bed. The cover 10 is illustrated in the raised position in FIGS. 2-4. Gas charged or air cylinders 22 control the speed at which the cover 10 is raised and lowered. They can also assist in keeping the cover 10 in the raised position until the user desires to lower the cover 10 to cover the truck bed 20. As seen clearly in FIG. 3, there is a strap 24 connected to the cover 10 to assist in pulling the cover 10 down to the closed position. The strap 24 is connected to the underside 13 of cover 10 with a fastener 26 passing completely through the cover 10 to securely fasten the strap 24 to the cover 10. The tonneau cover is thus installed and functions similarly as the tonneau covers of the prior art.

The cover 10 can also be provided with gaskets 15 near the perimeter of the underside 13 of cover 10 in alignment with the top of the upstanding walls 18. This keeps moisture and other foreign objects from entering the cargo bed when the cover 10 and gaskets 15 are closed on the upstanding walls 18. The cover 10 can also be provided with a locking mechanism to limit access to the cargo bed when the cover 10 is closed and the lock engaged.

Figure 5:
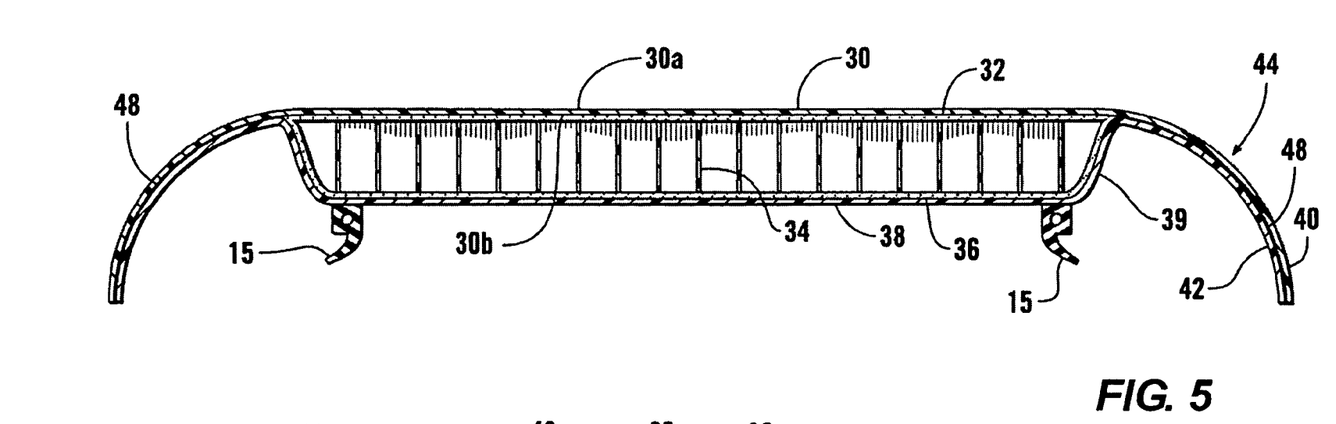
FIG. 5 is a cross-sectional view of an exemplary embodiment of a tonneau cover according to the invention.
Figure 6:
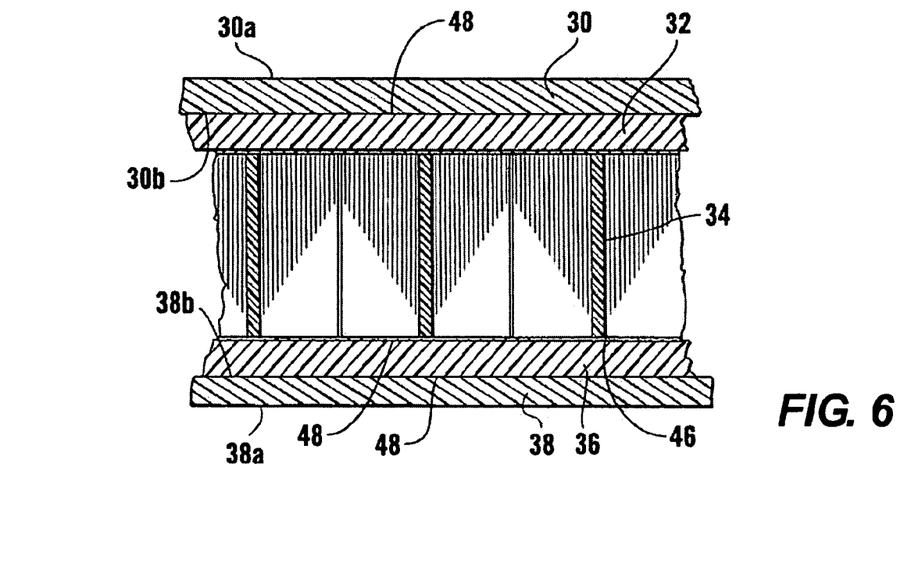
FIG. 6 is an enlarged cross-sectional view of an exemplary embodiment of a tonneau cover according to the invention.

The structure of the cover 10 is illustrated in FIGS. 5 and 6. There is a top sheet 30 which has an outer surface 30a exposed to the elements and visible for observation at all times and an inner surface 30b. For this reason top sheet 30 must be weather and ultraviolet resistant and be capable of maintaining an attractive painted or molded outer surface 30a even though exposed to the elements. Thus, top sheet 30 is generally made from a blend of polycarbonate (referred to as "PC") and acrylonitrile butadiene styrene (referred to as "ABS") plastic which has these qualities (the two polymers blended together is referred to herein as "PC/ABS"). In various embodiments, top sheet 30 may be made from materials such as polycarbonate acrylonitrile butadiene styrene, acrylonitrile butadiene styrene, fiber reinforced polyethylene, and/or fiber reinforced thermoplastic polyolefin. Alternatively it may have an acrylic or thermoplastic polyolefin (referred to as "TPO") surface that is co-extruded over PC/ABS plastic which gives the outer surface 30a of top sheet 30 additional ultraviolet ray resistance and improved color characteristics. It may also have a paint film laminated or co-extruded over the top sheet 30.

In another embodiment the top sheet may be manufactured from a fiber reinforced plastic sheet which may make it possible to use thinner plastic having the same qualities and characteristics.

Beneath the top sheet 30 is a first fiberglass layer 32. This can be made with a fiberglass mat or a sprayed-in layer of chopped fiberglass. A ¾ ounce fiberglass mat is used in the preferred embodiment. The thickness of the first fiberglass layer 32 is approximately 0.015 inches.

Next there is a layer 34 of honeycomb structure. This is preferably a Kraft paper product fabricated to form a continuous series of triangular cells, similar in appearance to the cross section view of corrugated board. The honeycomb can be supplied by Tricel Honeycomb Corporation, 2100 Swanson Court, Gurnee, IL 60031 and sold under the trademark TRICEL. In other embodiments, the honeycomb may be made from materials such as paper, reinforced paper, cardboard, reinforced cardboard, plastic, and metal. The honeycomb cores are up to 95% open space, with a density of one to three pounds per cubic foot. The maximum distance between cell walls should not be greater than five inches in order to provide sufficient structural strength. When bonded to a facing material on both sides, the resulting structure resembles an I-beam in performance and carries substantial shear, bending and compressive loads. In an alternative embodiment the honeycomb structure can be fabricated from plastic, metal, or cardboard or otherwise reinforced for additional strength. The honeycomb layer 34 defines a plurality of edges or joining lines 46 on both sides of the honeycomb layer 34 that contact the layers immediately above and below the honeycomb layer. In various embodiments, the joining lines 46 are bonded to the first fiberglass layer 32 and/or the second fiberglass layer 36.

The honeycomb 34 can be impregnated with phenolic resin for additional strength. The honeycomb is easier to bond to fiber reinforced plastics and other plastics than other closed cell products such as foam. The honeycomb 34 can be easily cut with a knife, band saw, or power saw. It is very cost effective when compared to other middle layer materials such as particleboard, foam, Balsa, or plywood. Beneath the honeycomb structure 34 is a second layer of fiberglass 36. This is similar to the first layer 32 and preferably identical to the first layer 32. Beneath the second layer 36 is a bottom sheet 38. The bottom sheet 38 is similar to the top sheet 30 and generally made of PC/ABS plastic to impart additional strength and temperature performance. It has an outer surface 38a and an inner surface 38b. Additionally, bottom sheet 38 has an up-rolled structure 39 near its perimeter for added stiffness.

In order to manufacture the completed tonneau cover 10, the process is as follows. First the top sheet 30 is turned upside down exposing the inner surface 30b. The outer surface 30a of the top sheet 30 is protected so that the outer surface 30a is not scratched. The inner surface 30b is sprayed with a polyester resin 48 such as Hycryl H515-BCA-08 polyester resin manufactured by AOC located at 950 Highway 57 East, Collierville, Tenn. 38071. Next the fiberglass material is applied. If a fiberglass mat is used, it is laid in on top of the polyester resin. If the fiberglass is sprayed on, it is applied in the recommended manner on top of the resin. This is followed by another application of the polyester resin 48. The first fiberglass layer 32 will absorb some of the resin. The honeycomb structure 34 is placed on the fiberglass layer 32. Another application of the polyester resin is applied to the honeycomb structure 34. Then the second fiberglass layer 36 is laid in on top of the honeycomb structure 34. This is followed by another application of the polyester resin 48 and/or by applying another adhesive to the inner surface 30b of the perimeter of top sheet 30. Lastly the bottom sheet 38 is applied on top of the second fiberglass layer 36 on honeycomb structure 34 and the inner surface 30b of the top sheet 30. The inner surface 38b comes in contact with the second fiberglass layer 36. The up-rolled structure 39 in bottom sheet 38 provides additional surface for the perimeter adhesive 48. The entire cover 10 is restrained in its final shape until the resin and/or other adhesive reach a handling cure. The restraint is then removed and the cover 10 is ready for any final trimming or decorating and assembly.

One improvement of this cover 10 over prior art covers is that the use of the honeycomb with fiberglass layers adds structural strength and temperature performance to the cover, and the resin greatly improves the bonding between the top sheet 30 and the honeycomb structure 34 and the honeycomb structure 34 and the bottom sheet 38. The first fiberglass layer 32 and the second fiberglass layer 36 act as a binder to resist separation of the honeycomb structure 34 from the top sheet 30 and the bottom sheet 38, especially in shear mode. This problem is very apparent when foam is used as a layer between plastic top and bottom sheets.

The center of cover 10 has a final cross sectional thickness ranging from approximately 0.625 to 1.125 inches thick, which is comparable to or less than other tonneau covers on the market, having similar strength qualities. The cover 10 also allows attachment of accessories to the cover over its entire surface as it is uniform in thickness and strength. For example the strap 24 is attached by the fastener 26 that passes through the cover 10 and can be located anywhere on the outer surface 38a of the bottom layer of cover 10. This is a great improvement over prior art devices that only allowed attachment of accessories at specific reinforced locations over the surface of the cover.

In various embodiments, the top sheet is provided with a perimeter edge 40 in the form of a turned down lip. Bottom sheet 38 may be provided with a complementary perimeter edge 42 that is adapted to fit with and be joined to perimeter edge 40. In various embodiments, the perimeter edge and the complementary perimeter edge 42 are joined with an adhesive.

Thus there has been provided a tonneau cover that fully satisfies the objects and advantages set forth herein. While the invention has been described in conjunction with a specific embodiment, it is evident that many alternatives, modifications and variations will be apparent to those skilled in the art in light of the foregoing description such as using different shell geometries, different shell materials, different bonding agents, different bonding layers, different honeycomb geometries and different honeycomb materials. Accordingly, it is intended to embrace all such alternatives, modifications and variations.

What is claimed is:

1. A rigid pickup truck bed tonneau cover assembly, comprising:
   a top sheet of plastic having a smooth outer surface, an inner surface, and a perimeter edge;
   a bottom sheet of plastic having a substantially uniform outer surface, an inner surface, and a complementary perimeter edge;
   a middle layer of honeycomb structure;
   a first fiberglass layer in between the top sheet and the middle layer;
   a second fiberglass layer in between the bottom sheet and middle layer;
   resin attaching the top plastic sheet to the first fiberglass layer;
   resin attaching the bottom plastic sheet to the second fiberglass layer and the complementary perimeter edge to the perimeter edge;
   resin attaching the first fiberglass layer and the second fiberglass layer to the middle layer; and
   wherein the perimeter edge is a turned down lip that engages the complementary perimeter edge for providing protection from foreign elements entering the truck bed; and
   a gasket around at least a portion of an outer contour of the bottom sheet for engaging the upstanding walls of a truck bed and resisting entry of foreign material into the truck bed.

2. The pickup truck bed rigid tonneau cover assembly of claim 1 wherein the perimeter edge and the complementary edge are joined together by an adhesive.

3. The pickup truck bed rigid tonneau cover assembly of claim 1 wherein the bottom sheet has an up-rolled structure near an edge of the middle layer for added stiffness.

4. A rigid tonneau cover assembly for a pickup truck bed, the rigid cover comprising:
   a top sheet of plastic having a smooth outer surface, an inner surface, and a perimeter edge;
   a bottom sheet of plastic having a substantially uniform outer surface, an inner surface, and a complementary perimeter edge;
   a first fiberglass layer attached to the inner surface of the top sheet;
   a second fiberglass layer attached to the inner surface of the bottom sheet; and
   a middle layer of honeycomb structure attached to the fiberglass layer and the second fiberglass layer; and
   wherein:
   the perimeter edge is a turned down lip that engages the complementary perimeter edge for providing protection from foreign elements entering the truck bed;
   the top sheet of plastic and the first layer of fiberglass are bonded together with a resin;
   the first fiberglass layer and the middle layer are bonded together with a resin;

the middle layer and the second fiberglass layer are bonded together with a resin;

the second fiberglass layer and the bottom sheet of plastic are bonded together with a resin; and the perimeter edge and the complementary perimeter edge are bonded together with a resin.

5. The rigid pickup truck bed tonneau cover assembly of claim 4 wherein the perimeter edge and the complementary edge are further bonded together by an adhesive.

6. The rigid pickup truck bed tonneau cover assembly of claim 4 wherein the bottom sheet has an up-rolled structure near an edge of the middle layer.

7. The rigid pickup truck bed tonneau cover assembly of claim 1 wherein the honeycomb structure comprises material selected from the group consisting of paper, reinforced paper, cardboard, reinforced cardboard, plastic, and metal.

8. The rigid pickup truck bed tonneau cover assembly of claim 4 wherein at least one of the first fiberglass layer and second fiberglass layer comprises material selected from the group consisting of fiberglass mats and sprayed-in fiberglass.

9. The rigid pickup truck bed tonneau cover assembly of claim 4 wherein the honeycomb structure has a plurality of edges that provide binding locations between the honeycomb and its respective top or bottom sheet to which it is bonded.

10. The rigid pickup truck bed tonneau cover assembly of claim 4 wherein the top sheet of plastic comprises material selected from the group consisting of polycarbonate and acrylonitrile butadiene styrene, acrylonitrile butadiene styrene, fiber reinforced polyethylene, and fiber reinforced thermoplastic polyolefin.

11. The rigid pickup truck bed tonneau cover assembly of claim 4 wherein the bottom sheet of plastic comprises material selected from the group consisting of polycarbonate and acrylonitrile butadiene styrene, acrylonitrile butadiene styrene, fiber reinforced polyethylene, and fiber reinforced thermoplastic polyolefin.

12. The rigid pickup truck bed tonneau cover assembly of claim 4 further comprising an acrylic surface over the top sheet.

13. The rigid pickup truck bed tonneau cover assembly of claim 4 further comprising a thermoplastic polyolefin surface over the top sheet.

14. The rigid pickup truck bed tonneau cover assembly of claim 4 further comprising a paint film over the top sheet.

15. A rigid pickup truck bed tonneau cover assembly, comprising:

a top sheet of plastic having a smooth outer surface, an inner surface, and a perimeter edge;

a bottom sheet of plastic having a substantially uniform outer surface, an inner surface, and a complementary perimeter edge;

a first fiberglass layer attached to the inner surface of the top sheet with a resin;

a second fiberglass layer attached to the inner surface of the bottom sheet with a resin;

a honeycomb middle layer wherein the honeycomb middle layer is comprised of a plurality of cells comprised of cell walls substantially perpendicular to the top sheet and bottom sheet, the cell walls defining a plurality of joining lines on a top and on a bottom of the honeycomb middle layer;

the joining lines on the top of the honeycomb middle layer attached to the first fiberglass layer with a resin and the joining lines on the bottom of the honeycomb middle layer attached to the second fiberglass layer with a resin for providing structural strength to the rigid cover; and the perimeter edge attached to the complementary perimeter edge with a resin.

16. The rigid pickup truck bed tonneau cover assembly of claim 15 wherein the perimeter edge and the complementary edge are joined together by an adhesive.

17. The rigid pickup truck bed tonneau cover assembly of claim 15 wherein the bottom sheet has an up-rolled structure near an edge of the middle layer for added stiffness.

18. A method for providing a reinforced cargo bed cover for a pickup truck comprising the steps of:

forming a top sheet of plastic in a shape to cover the cargo bed with an inner surface, a smooth outer surface, and a perimeter edge;

forming a bottom sheet of plastic in a shape to conform to the shape of the top sheet at or near their perimeters with a substantially uniform outer surface, an inner surface, and a complementary perimeter edge;

applying a coat of resin to the inner surface of the top sheet;

applying a first fiberglass layer to the inner surface of the top sheet;

applying a coat of resin to the first fiberglass layer;

attaching a honeycomb structured middle layer to the first fiberglass layer;

applying a coat of resin to the middle layer;

applying a second fiberglass layer to the middle layer;

applying a coat of resin to the second fiberglass layer; and attaching the inner surface of the bottom sheet to the second fiberglass layer and the complementary perimeter edge to the perimeter edge.

19. The method of claim 18 further comprising adhesively joining the perimeter edge to the complementary perimeter edge.

20. The method of claim 19 further comprising forming a rolled structure near the perimeter of the bottom sheet.

21. The method of claim 18 further comprising providing an acrylic surface over the outer surface of the top sheet.

22. The method of claim 18 further comprising providing a thermoplastic polyolefin over the outer surface of the top sheet.

23. The method of claim 18 further comprising providing a paint film surface over the outer surface of the top sheet.

24. A method for providing a reinforced tonneau pickup truck bed cover, comprising:

forming a top sheet of plastic in a shape to cover the cargo bed with an inner surface, a smooth outer surface, and a perimeter edge;

forming a bottom sheet of plastic in a shape to conform to the shape of the top sheet at or near their perimeters with a substantially uniform outer surface, an inner surface, and a complementary perimeter edge;

providing a first fiberglass layer;

providing a second fiberglass layer;

providing a honeycomb structured middle layer to the first fiberglass layer and to the second fiberglass layer;

bonding the top sheet of plastic and the first layer of fiberglass with a resin;

bonding the first fiberglass layer and the middle layer with a resin;

bonding the middle layer and the second fiberglass layer with a resin;

bonding the second fiberglass layer and the bottom sheet of plastic with a resin; and bonding the perimeter edge and the complementary perimeter edge with a resin.

25. The rigid tonneau cover assembly of claim 1 further comprising resin coating the middle layer.

26. The rigid tonneau cover assembly of claim 4 further comprising a coating of resin disposed between on the middle layer and the first fiberglass layer.

27. The rigid tonneau cover assembly of claim 4 further comprising a gasket around at least a portion of the outer contour of the bottom sheet for engaging the upstanding walls of a truck bed and resisting entry of foreign material into the truck bed.

28. The rigid tonneau cover assembly of claim 15 further comprising a gasket around at least a portion of the outer contour of the bottom sheet for engaging the upstanding walls of a truck bed and resisting entry of foreign material into the truck bed.

* * * * *

UNITED STATES PATENT AND TRADEMARK OFFICE
CERTIFICATE OF CORRECTION

PATENT NO. : 7,588,283 B2
APPLICATION NO. : 11/543000
DATED : September 15, 2009
INVENTOR(S) : Zajicek et al.

It is certified that error appears in the above-identified patent and that said Letters Patent is hereby corrected as shown below:

On the Title Page, in Item (57), under "ABSTRACT", in Column 2, Line 2, delete "tip plastic" and insert -- top plastic --, therefor.

On the Title Page, in Item (57), under "ABSTRACT", in Column 2, Line 8, delete "honey comb" and insert -- honeycomb --, therefor.

In the Specification

In Column 3, Line 52, delete "top 12" and insert -- top surface 12 --, therefor.

In the Claims

In Column 9, Line 4, in Claim 26, delete "between on the" and insert -- between the --, therefor.

Signed and Sealed this
Eighth Day of October, 2013

Teresa Stanek Rea
*Deputy Director of the United States Patent and Trademark Office*